Jan. 27, 1948.  R. BLACK, JR., ET AL  2,434,900

SONIC TRANSLATING DEVICE

Filed July 14, 1943

INVENTORS R. BLACK, JR.
F. F. ROMANOW
BY
Walter C. Kiesel
ATTORNEY

Patented Jan. 27, 1948

2,434,900

UNITED STATES PATENT OFFICE 2,434,900

SONIC TRANSLATING DEVICE

Robert Black, Jr., South Orange, and Frank F. Romanow, Summit, N. J., assignors to Bell Telephone Laboratories, Incorporated, New York, N. Y., a corporation of New York Application July 14, 1943, Serial No. 494,742

9 Claims. (Cl. 177—386)

This invention relates to sonic translating devices and more particularly to compressional wave projectors and receivers especially suitable for submarine signaling.

One general object of this invention is to improve the operating characteristics of sonic translating devices. More specific objects of this invention are to improve the fidelity of translation of signals by compressional wave submarine signaling devices, to extend the operating frequency range of such devices and to obtain a uniform response for such devices throughout a wide frequency range.

In one illustrative embodiment of this invention, a pressure type hydrophone comprises one or more inertia-type electromechanical translating units mounted within a water-tight shell or casing constructed to be capable of bodily vibration throughout a wide range of frequencies, the translating units having their driving elements rigidly connected to the shell or casing.

In accordance with one feature of this invention, the shell or casing is mounted resiliently for vibration bodily upon a weighty housing which encloses substantially one-half of the shell or casing and is provided with a restricted port or aperture presenting a high impedance to transmission of compressional wave energy therethrough but allowing ingress of water into the housing whereby equalization of static pressures upon the shell or casing is realized.

In accordance with another feature of this invention, an air chamber is provided within the housing to adjust the stiffness reactance of the body of water within the housing and the chamber is correlated with this reactance and the mechanical reactance of the shell or casing and the resilient support therefor so that the vibrating system exhibits a resonance at a frequency in the upper portion of the range to be translated whereby a uniform response throughout a wide range of frequencies is attained.

Figure 1:
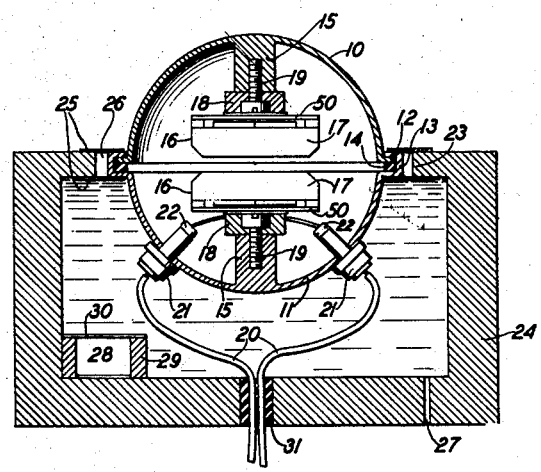
Figure 2:
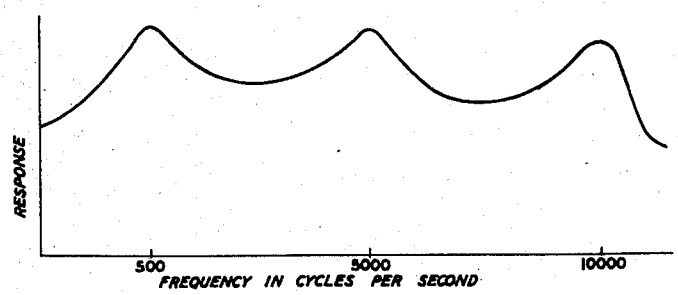

The invention and the above-noted and other features thereof will be understood more clearly and fully from the following detailed description with reference to the accompanying drawing, in which:

Fig. 1 is a side view mainly in section of a hydrophone illustrative of one embodiment of this invention, and Fig. 2 is a graph illustrating a typical response characteristic for a hydrophone of the construction shown in Fig. 1.

Referring now to the drawing, the hydrophone illustrated in Fig. 1 is of the pressure type and is particularly suitable for use at great depths of submersion, for example, for location upon the sea bottom in areas to be patrolled sonically to indicate the presence or approach of surface ships and submarines. The hydrophone comprises a spherical shell, for example of cast metal, such as aluminum, or steel pressed into the proper shape, formed of two similar halves 10 and 11 having flanges 12 and 13 respectively, an annular compressible gasket 14, for example of rubber, being interposed between the flanges. The flange 13 is crimped around and against the flange 12 to form a water-tight seal between the two halves 10 and 11.

Each of the shell halves 10 and 11 is provided with a rigid support or post 15, for example cast or formed integral therewith, the two posts being aligned diametrically of the shell and mounting substantially identical inertia-type electromagnetic translating units 16. The translating units may be of the construction described in Patent 2,202,906, granted June 4, 1940, to Melville S. Hawley, and comprise a magnet 17 and a magnetic armature 18, the armature being secured to the respective support or post 15, as by a screw 19, and connected by a resilient support or spring 50 to the corresponding magnet. The armature of each unit vibrates, due to the sound pressure acting on the exposed half of the shell which is rigidly attached to the armatures. Since the magnets are non-rigidly attached to the armatures namely by a spring and because of the inertia of these magnets which tend to stand still as the armatures vibrate, relative motion between the cooperating armature and magnet occurs, the reluctance of the magnetic circuit defined by the armature and magnet is varied, and a voltage corresponding to the force causing vibration of the armature is established in the signal coil or coils, not shown, linked to the magnetic circuit. Advantageously, the signal coils of the two translating units are connected in parallel to provide a relatively low impedance. Electrical connection to these coils may be established through conductors 20 extending through metallic eyelets 21 and hermetically sealed thereto by vitreous beads 22, the eyelets being sealed hermetically to the shell half 11.

The shell 10, 11 is supported from the centrally apertured wall or flange 23 of a weighty cylindrical housing 24 by a pair of resilient, for example metallic, supports or annuli 25 which are joined hermetically to the flanges 12, 13 and 23 and define wall portions of a restricted air chamber 26 of sufficient stiffness to withstand great hydrostatic pressures. The housing 24 is provided with a restricted port or aperture 27 which allows ingress of water into the housing whereby equalization of static pressures acting upon the shell 10, 11 is realized, but presents a sufficiently high impedance to compressional wave energy to substantially prevent transmission of such energy therethrough.

Provided within the housing 24 is an air chamber 28, the function of which will be pointed out hereinafter, which is bounded by a rigid frame 29 and a flexible, for example metallic, diaphragm 30.

The conductors 20 may be brought out through a resilient gasket or gland 31 which forms a water-tight seal between the conductors and the base of the housing 24.

Because of its form and construction, the shell 10, 11 is capable of vibrating bodily without relative motion between portions thereof throughout a wide range of frequencies, for example the range of frequencies up to of the order of 11,000 cycles per second, so that distortion of the signals to be translated is substantially prevented throughout this range. Because of the small mass of the shell and the equalization of the static pressures as pointed out hereinabove, the shell is vibrated in response to and in accordance with even small pressures effective thereon, due to compressional wave signals. When the shell vibrates, the armatures 18, which constitute the driving members of the units 16, also vibrate and, as a result, electromotive forces generally proportional to the armature velocity are induced in the coils of the translating units 16. The units, it will be appreciated, are highly sensitive to small displacement forces effective upon the armatures thereof.

The response characteristics of the units 16 will be dependent, of course, upon the mechanical parameters thereof and each unit will have a resonant frequency determined largely by the relation of the stiffness reactance of the spring 50 and the mass reactance of the magnet 17. In a typical unit wherein the reactances mentioned were substantially equal, a resonance at approximately 500 cycles per second occurred. Above the resonant frequency, because of the high mass reactance of the magnet 17, the response of the unit decreases fairly rapidly.

The water in the housing 24 presents a large stiffness reactance which is reduced by the stiffness reactance in series therewith provided by the air chamber 28. By correlation, in accordance with principles known in the art, of the impedances involved and more specifically by providing an air chamber 28 of the requisite volume, the stiffness reactance introduced thereby enables realization of a second resonance at a moderately high frequency, for example at approximately 5,000 cycles per second, so that the response at frequencies above the first resonance aforenoted is substantially enhanced, the operating frequency range of the hydrophone is greatly extended and a substantially uniform response throughout a wide band of frequencies, for example from 500 to 10,000 cycles per second is attained.

The shell 10, 11 and the support 25 therefor also may have a resonance frequency which advantageously is made within the range to be translated, for example at approximately 2,500 cycles per second, so that the mid-range response is enhanced. If this resonance results in an unduly pronounced peak in the response characteristic, a suitable damping material, such as butyl rubber, may be provided upon or in engagement with the support 25 to reduce or suppress such peak.

A typical response characteristic for a hydrophone of the construction shown in Fig. 1 is illustrated in Fig. 2 wherein the resonances at approximately 500 and 5,000 cycles per second are seen clearly.

Although a specific embodiment of the invention has been shown and described, it will be understood, of course, that it is but illustrative and that various modifications may be made therein without departing from the scope and spirit of this invention as defined in the appended claims.

What is claimed is:

1. A compressional wave signal translating device comprising a rigid shell, a housing enclosing only substantially one-half of said shell and having an opening therein presenting a high impedance to the transmission of compressional wave energy therethrough, resilient means supporting said shell from said housing, and an inertia-type electromechanical translating unit within said shell and including a driving member coupled thereto.

2. A hydrophone comprising a bodily vibratile spherical shell, a housing enclosing only substantially one hemispherical half of said shell and having a restricted port allowing ingress of water into said housing but substantially preventing transmission of compressional wave energy, resilient means supporting said shell upon said housing, and an inertia-type electromechanical translating unit within said shell and actuated by motion thereof.

3. A hydrophone comprising a substantially spherical shell having an annular flange and having also a support extending substantially normal to the plane of said flange, an inertia-type electromechanical translating unit within said shell and including a driving member coupled to said support, a housing having an apertured outer wall portion, and annular resilient support means connecting said flange to said apertured wall portion.

4. A hydrophone comprising a substantially spherical shell having a diametrical annular flange, a housing having an apertured wall extending outwardly from adjacent said flange and enclosing only substantially one-half of said shell, spaced resilient annuli connecting said flange to said wall, a pair of inertia-type electromechanical translating units within said shell and each having a driving member, and means connecting the driving members of said units to diametrically opposite portions of said shell, aligned normal to the plane of said flange.

5. A hydrophone comprising a substantially spherical, bodily vibratile shell having a diametrical annular flange, a pair of rigid posts within said shell and extending from diametrically opposite areas thereof aligned normal to the plane of said flange, a pair of inertia-type electromechanical translating units within said shell, each having a driving member connected to a corresponding one of said posts, a housing enclosing substantially one-half of said shell and having a wall portion extending from adjacent said flange, and spaced resilient annular supports connecting said flange to said wall portion, said housing having a restricted port allowing ingress of water into said housing but presenting great impedance to the transmission of compressional wave energy.

6. A compressional wave signal translating device comprising a shell, a housing enclosing a portion of said shell and defining a chamber therewith, said housing having a port therein communicating with said chamber, means resiliently mounting said shell from said housing, an electromechanical translating unit within said shell and actuated in accordance with motion thereof, said unit having a resonance at a frequency in the range of frequencies to be translated by said device, and means defining within said chamber an air chamber having a predetermined stiffness such that said shell has a natural period of vibration at a different frequency in said range.

7. A hydrophone comprising a shell, a housing enclosing a portion of said shell and defining a chamber therewith, said housing having a restricted aperture allowing ingress of water into said chamber, resilient means supporting said shell from said housing, an inertia-type electromechanical translating unit within said shell and including a driving member coupled thereto, said unit having a resonance at a frequency in the lower end of the range of frequencies to be translated by the hydrophone, and means for adjusting the stiffness due to said chamber such that said shell has a natural period of vibration at a frequency in the upper portion of said range.

8. A hydrophone in accordance with claim 7 wherein said adjusting means comprises means including a vibratile diaphragm defining an air chamber within said first chamber.

9. A hydrophone comprising a substantially spherical shell having an annular flange and having also a pair of diametrically aligned supports thereon extending normal to the plane of said flange, a housing having an apertured end wall extending from adjacent said flange and having also a restricted aperture therein, resilient means connecting said flange and said end wall, said means, housing and a portion of said shell bounding a chamber into which water has ingress by way of said restricted aperture, a pair of inertia-type electromechanical translating units within said shell, each including a driving member coupled to a corresponding one of said supports, and means including a diaphragm bounding an air chamber within said first chamber, said units having a resonance at a frequency within the low end of the range of frequencies to be translated by said hydrophone and said air chamber having such stiffness as to fix the resonant frequency of said shell within the upper end of said range.

ROBERT BLACK, JR.
F. F. ROMANOW.

REFERENCES CITED

The following references are of record in the file of this patent:

UNITED STATES PATENTS

| Number | Name | Date |
| --- | --- | --- |
| 1,393,471 | Wegel | Oct. 11, 1921 |
| 2,202,906 | Hawley | June 4, 1940 |
| 2,008,713 | Hayes | July 23, 1935 |
| 1,345,717 | Thomas | July 6, 1920 |

FOREIGN PATENTS

| Number | Country | Date |
| --- | --- | --- |
| 298,879 | Germany | Sept. 21, 1920 |
| 401,264 | France | Aug. 24, 1909 |